United States Patent [19]

Witte

[11] 4,083,081

[45] Apr. 11, 1978

[54] HANDLE SECURING DEVICE

[75] Inventor: Günther Witte, Attendorn, Germany

[73] Assignee: Gebr. Dingerkus, Attendorn, Germany

[21] Appl. No.: 744,264

[22] Filed: Nov. 23, 1976

[30] Foreign Application Priority Data

Nov. 27, 1975 Germany ............................. 2553308

[51] Int. Cl.² ............................................. A47B 95/02
[52] U.S. Cl. ............................... 16/114 A; 220/94 R; 403/322; 403/328
[58] Field of Search ............ 16/110 A, 114 A, 110 R, 16/114 R; 220/94 R; 403/327, 324, 322, 329, 328; 292/353, 352

[56] References Cited

U.S. PATENT DOCUMENTS

| 691,050 | 1/1902 | Dronne | 16/114 R |
| 1,652,289 | 12/1927 | Owen | 403/329 X |
| 3,691,605 | 9/1972 | Witte | 220/94 R X |
| 3,878,584 | 4/1975 | Witte | 16/110 A |
| 3,956,792 | 5/1976 | Fischbach | 16/114 A |

FOREIGN PATENT DOCUMENTS 2,134,096  1/1973  Germany ............................ 16/110 A

*Primary Examiner*—Andrew V. Kundrat
*Attorney, Agent, or Firm*—Spencer & Kaye

[57] ABSTRACT

A handle is immobilized on a carrier portion of an article by a handle securing device. The handle has a recess which accommodates the carrier portion. The securing device includes a detent notch provided in the carrier portion and an elongated latch member disposed within the recess and arranged in the detent notch in an orientation transverse to the direction in which the handle is inserted on the carrier portion. The handle has guide grooves within the handle recess and receives the ends of the latch member. The securing device has a spring arranged in the handle recess and urges the latch member against the handle and the carrier portion for locking the handle and the carrier portion to one another.

5 Claims, 8 Drawing Figures

HANDLE SECURING DEVICE

BACKGROUND OF THE INVENTION

This invention relates to a device for securing a handle to an article, such as a cooking vessel. From the article there extends a carrier portion on which the handle may be inserted and which is then hidden by the handle. The securing device includes a spring arrangement that effects a snap-in engagement of the handle on the carrier portion.

A handle securing device of the above-outlined type is known and is disclosed, for example, in U.S. Pat. No. 3,878,584. According to the structure described in this patent, the spring is attached by a securing screw in an insert opening (recess) of the handle and has an angularly bent support portion which has a free terminal leg oriented obliquely outwardly, towards the article wall. The spring has another end portion which extends at an acute angle with respect to the carrier portion of the article and is so bent that it is oriented away from the article wall and extends into a detent provided on the carrier portion.

Further, the support portion is so designed that its outer edge engages the carrier portion and the free leg is in engagement with an inclined surface of the handle terminal oriented toward the article wall.

A handle securing device of the above type, however, requires relatively long carrier portions, and consequently, the handle recess which receives the carrier portion has to be relatively deep. Further, the spring has a complex spatial configuration and also, mounting the spring within the handle recess is a relatively involved operation.

SUMMARY OF THE INVENTION

It is an object of the invention to provide an improved handle securing device of the above-outlined type in which the spring structure and its positioning in the handle recess are substantially simplified and with which a permanent, play-free, firm attachment of the handle is insured.

It is a further object of the invention to provide a handle securing device of the above-outlined type which accepts manufacturing tolerances that may be significantly greater than in prior art devices.

These objects and others to become apparent as the specification progresses, are accomplished by the invention, according to which, briefly stated, the securing device includes a detent notch provided in the carrier portion and an elongated latch member disposed within the recess and arranged in the detent notch in an orientation transverse to the direction in which the handle is inserted on the carrier portion. The handle has guide grooves within the handle recess and receives the ends of the latch member. The securing device further has a spring arranged in the handle recess and urges the latch member against the handle and the carrier portion for locking the handle and the carrier portion to one another.

A handle securing means according to the invention as defined above ensures an attachment of the handle on a carrier portion not by means of the known spring structure which may be liable to frequent failures but by means of a non-deformable latch which adjusts itself by virtue of the spring force of the spring element and with which the handle is locked on the carrier portion in a more secure manner than it has been possible heretofore.

It is a further advantage of the invention that the spring may have a simpler configuration and its positioning in the handle recess may be effected in a simpler manner than it has been possible in prior art arrangements.

According to a further feature of the invention which is particularly advantageous for use in cooking vessels made of light metal, the latch is constituted by a roller pin which is in rolling engagement with the carrier portion. By virtue of this measure, light-metal cooking vessels can be provided with a handle without the risk that the coupling element causes corrosion on the carrier portion. Thus, even in case of carrier portions made of relatively soft light metals, a self-adjustability of the latch (required, for example, because of fatigue of material) will be preserved.

In accordance with a preferred embodiment of the invention, the terminal portions of the spring engaging the latch are in contact with a common longitudinal wall bounding the handle recess and the spring is so designed that it can execute springing motions with respect to this longitudinal wall. A handle securing device designed in this manner is characterized by a simple, substantially straight spring which could not be used heretofore and which is loaded similar to a beam resting on two supports. Thus, at given equal dimensions of the handle and the carrier portion, greater spring paths are possible than heretofore and thus it is possible to bridge greater manufacturing tolerances than it has been possible in prior art structures.

In the securing means designed according to the invention, springs with sharply angled portions which adversely affect the durability of the spring need no longer be used.

According to a further feature of the invention, the carrier portion has the configuration of a U-shaped yoke. The yoke has a connecting web portion which is secured to the article wall and two parallel legs extending away from the article wall. The spring is accommodated between the yoke legs. In this manner particularly significant space saving can be achieved regarding the positioning of the spring and furthermore, the handle can be arranged in a particularly robust, non-rotating manner on the carrier portion.

According to a further advantageous feature of the invention, the spring lies, with its terminal portions, against the lower longitudinal wall bounding the handle recess and the detents of the carrier portion which cooperate with the latch, are arranged in the lower edges of the yoke legs.

According to a further feature of the invention — which, with simple means, insures a particularly secure positional stability of the spring — the latch which is formed as a roller pin, is held in a transverse groove of the spring in a form-fitting manner.

According to a further feature of the invention — which pertains to a simplification of the mounting of the handle — the terminal portion of the spring is shaped to constitute gliding shoes.

According to a further feature of the invention, the spring is positioned merely with its frontal end (as viewed in the direction of insertion) into a conforming tapered portion of the handle recess and is maintained in a pre-tensioned, springing state by the latch which engages the spring at its free terminal portion.

According to a further feature of the invention the spring has, at its frontal end, a portion of claw-like configuration.

DESCRIPTION OF THE PREFERRED EMBODIMENTS

Figure 1:
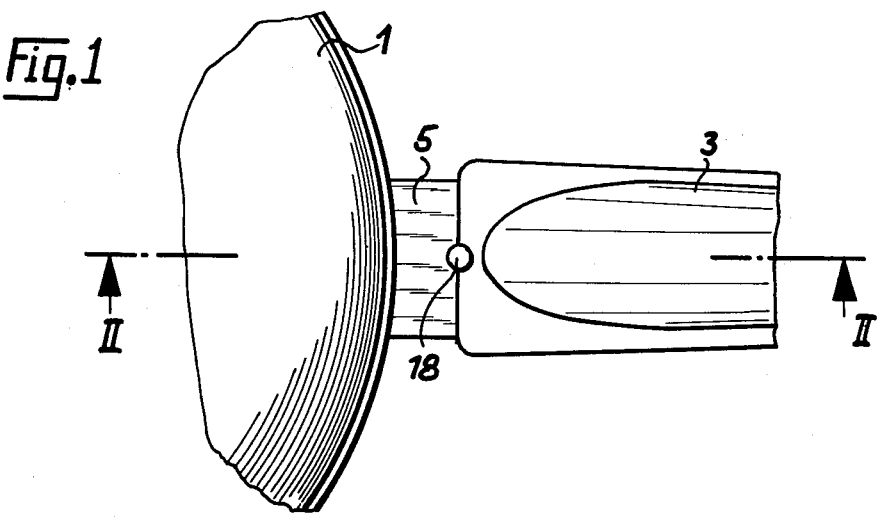
FIG. 1 is a fragmentary top plan view of a cooking vessel including a handle part which incorporates the invention.
Figure 2:
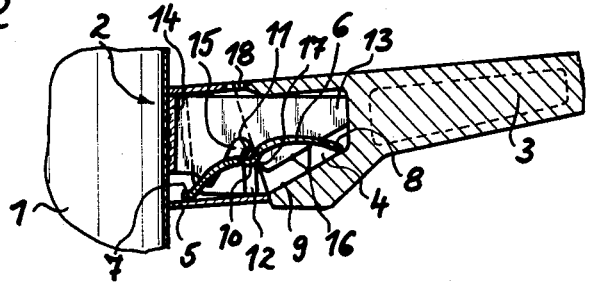
FIG. 2 is a sectional view taken along line II—II of FIG. 1, illustrating a preferred embodiment of the invention.
Figure 3:
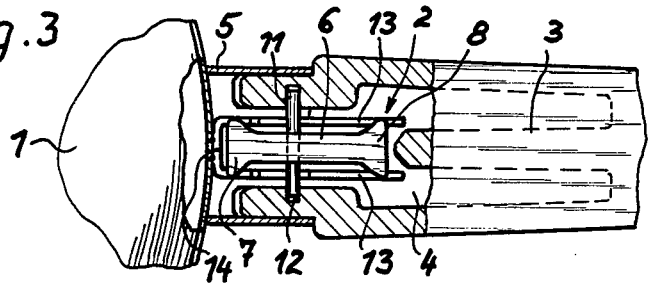
FIG. 3 is a partially broken-away bottom plan view of the structure shown in FIG. 2.
Figure 4:
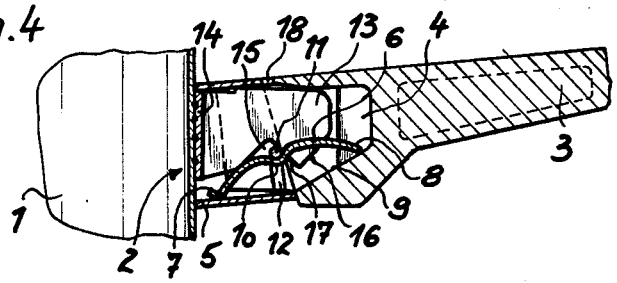
FIG. 4 is a sectional side elevational view of a structure similar to that shown in FIG. 2.

In all the embodiments, to a cooking vessel (such as a pot or pan) 1 there is affixed a carrier portion 2 on which there is inserted a handle 3. The latter is made of an insulating material and has a recess 4 adapted to accommodate the carrier portion 2.

The handle 3 carries a metallic sleeve 5 at its terminal portion oriented toward the cooking vessel 1.

Turning now in particular to FIGS. 1-4, in the handle recess 4 which is extended by the sleeve 5, there is arranged a spring 6 which has, throughout its length, a rectangular cross section and which has terminal portions 7 and 8 engaging the lower longitudinal wall 9 of the handle recess 4 and the lower inner wall of the sleeve 5 and may be deformed towards the wall 9 against the force of its own resilience.

In approximately the middle of the spring 6 there is provided an upwardly open transverse groove 10 which receives a roller pin 11 functioning as a latch that cooperates with the carrier portion 2. The ends of the pin 11 extend into guide grooves 12 which are provided in the oppositely located side walls of the handle recess 4 and which extend transversely to the longitudinal direction of the handle 3. Further, the guide grooves 12 are downwardly open and are closed off by means of the inserted sleeve 5. The carrier portion 2 has the configuration of a U-shaped yoke having parallel-extending legs 13 between which the spring 6 is arranged and a web 14 which interconnects the legs 13 and which is welded to the outside of the wall of the vessel 1. In the legs 13 of the carrier portion 2 there are provided detent notches 15, each having an adjoining flank 16 that obliquely rises in the direction of the insertion of the handle 3 and which serves as a run-up ramp for the roller pin 11. Each detent notch 15 has a flank 17 oriented away from the flank 16 and arranged in such a manner that when the handle 3 is in its inserted position, the spring 6 presses the handle 3 in a play-free manner to the carrier portion 2 and against the wall of the vessel 1.

In the handle 3 there is provided an opening 18 through which a tool, for example a pin, may be introduced for pressing down the spring 6 for removing the handle 3. In some cases it is feasible to replace the roller pin 11 by laterally projecting studs provided on the spring 6.

Figure 5:
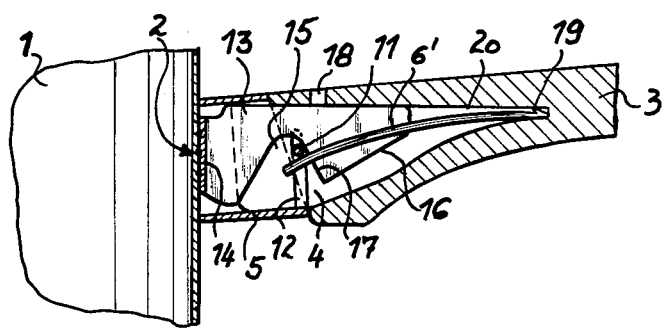
FIG. 5 is a sectional side elevational view of still another preferred embodiment of the invention.
Figure 6:
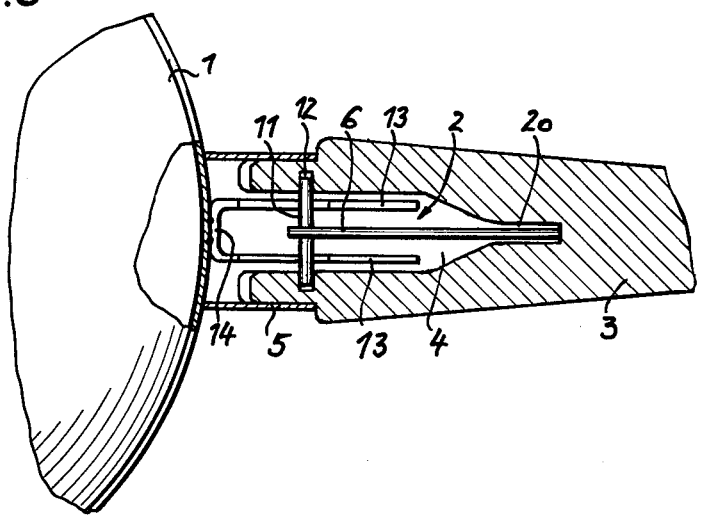
FIG. 6 is a partially broken-away bottom plan view of the structure illustrated in FIG. 5.

Turning now to the embodiment illustrated in FIGS. 5 and 6, most features thereof correspond to those of the earlier-described embodiment, except that the spring 6' is constituted here of a rod-like member of circular cross section, having a front part (as viewed in the direction of insertion) provided with an anchoring claw 19 and inserted into a conforming opening 20 constituting a tapered continuation of the handle recess 2. At its other end, the spring 6' is in engagement with the roller pin 11 by means of which the spring 6' is maintained in a biased state. In order to facilitate the insertion of the spring 6', the handle recess 4 tapers in the direction of the opening 20 in a funnel-like manner.

Figure 7:
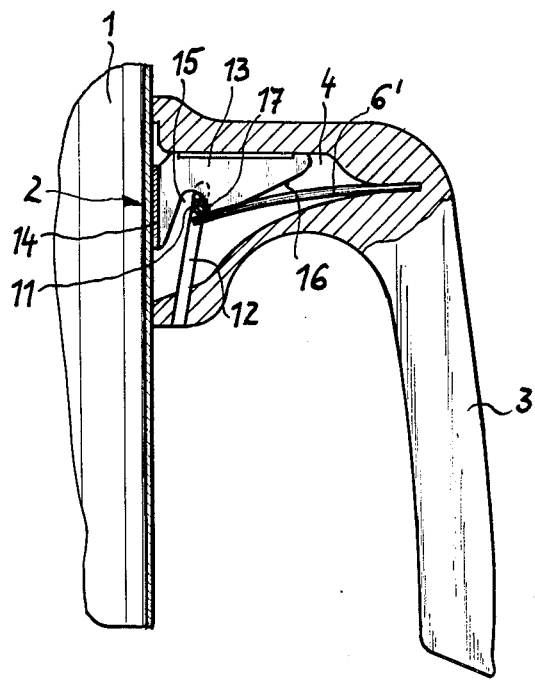
FIGS. 7 and 8 are sectional side elevational views of two modifications of the structure shown in FIGS. 5 and 6.

Turning now to the embodiment shown in FIG. 7, the vessel illustrated therein is a relatively deep milk pot, the handle 3 of which extends first radially outwardly with respect to the pan and terminates in a downwardly oriented handle portion. The handle portion facing the wall of the pot is attached to the carrier portion in a manner as described earlier.

Figure 8:
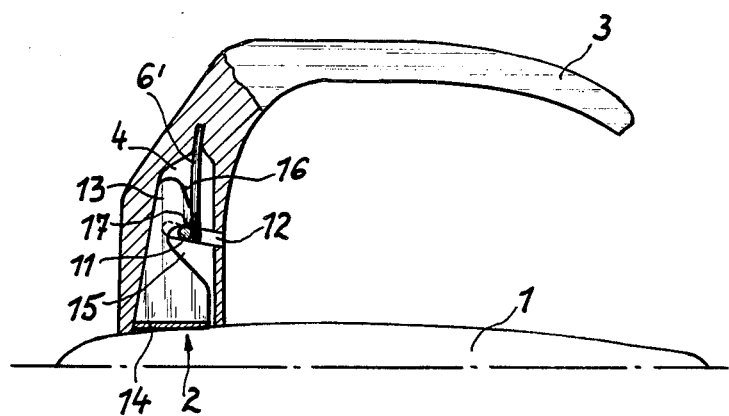

FIG. 8 shows a handle which is particularly adapted for attachment to a water boiler. The handle extends from a top wall of the vessel vertically upwardly and then terminates in a horizontally oriented portion. The vertical part of the handle which is adjacent the vessel is attached to the wall thereof as described earlier.

It will be understood that the above description of the present invention is susceptible to various modifications, changes, and adaptations, and the same are intended to be comprehended within the meaning and range of equivalents of the appended claims.

What is claimed is:

1. In a device for securing a handle to a handle carrier portion affixed to an article and extending away therefrom; the handle including a handle recess for accommodating the carrier portion upon insertion of the handle on the carrier portion in a direction of insertion; the improvement comprising
    (a) means defining a detent notch in said carrier portion;
    (b) an elongated latch member disposed within said recess and arranged in said detent notch in an orientation transverse to said direction of insertion; said latch member having opposite ends;
    (c) means defining guide grooves in said handle within said handle recess; said guide grooves receiving said ends of said latch member;
    (d) means defining a tapered continuation of said handle recess; and
    (e) a spring arranged in said handle recess and having a first end conformingly received in said tapered continuation and a second, opposite free end engaged by said latch member which maintains said spring in a biased state; said spring urging said latch member against said handle and said carrier portion for locking said handle and said carrier portion to one another.

2. A device as defined in claim 1, wherein said latch member is constituted by a roller pin rollingly engaging said carrier portion.

3. A device as defined in claim 2, further comprising means defining a transverse groove in said spring; said roller pin being received in said transverse groove in a form-fitting manner.

4. A device as defined in claim 1, wherein said carrier portion is constituted by a U-shaped yoke formed of a web affixed to the article and two parallel legs extending from said web; said spring being positioned between the legs of said yoke.

5. A device as defined in claim 1, wherein the first spring end received by said tapered continuation has at least one anchoring claw.

* * * * *